United States Patent
Degaugue

(10) Patent No.: US 10,059,378 B2
(45) Date of Patent: Aug. 28, 2018

(54) RANGE OF AT LEAST TWO TYPES OF MOTOR VEHICLE COMPRISING A SHEET METAL ROOF OR A GLASS ROOF

(71) Applicant: RENAULT s.a.s., Boulogne Billancourt (FR)

(72) Inventor: Remi Degaugue, Breteuil sur Iton (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 15/521,493

(22) PCT Filed: Oct. 16, 2015

(86) PCT No.: PCT/FR2015/052788
§ 371 (c)(1),
(2) Date: Apr. 24, 2017

(87) PCT Pub. No.: WO2016/075379
PCT Pub. Date: May 19, 2016

(65) Prior Publication Data
US 2017/0320524 A1  Nov. 9, 2017

(30) Foreign Application Priority Data
Oct. 24, 2014 (FR) .................................... 14 60247

(51) Int. Cl.
*B62D 25/06* (2006.01)
*B62D 25/07* (2006.01)

(52) U.S. Cl.
CPC ............. *B62D 25/07* (2013.01); *B62D 25/06* (2013.01)

(58) Field of Classification Search
CPC ................................ B62D 25/06; B62D 25/07
(Continued)

(56) References Cited

U.S. PATENT DOCUMENTS 3,596,980 A * 8/1971 Cadiou ................... B60R 13/07
296/154
7,165,806 B2 * 1/2007 Osterberg .............. B62D 25/06
296/203.03
(Continued)

FOREIGN PATENT DOCUMENTS

DE  10 2012 015 162 A1  2/2014
JP  2012-240527 A  12/2012

OTHER PUBLICATIONS

International Search Report dated Jan. 26, 2016 in PCT/FR2015/052788 filed Oct. 16, 2015.
(Continued)

*Primary Examiner* — Dennis H Pedder
(74) *Attorney, Agent, or Firm* — Oblon, McClelland, Maier & Neustadt, L.L.P.

(57) ABSTRACT

A range includes at least two types of motor vehicle including a first vehicle type with a sheet metal roof and a second type with a glass roof. Each of these vehicles includes a body shell structure having side rails with an outer wall facing an outside of the vehicle and an inner wall, forming an interior lining, facing an inside of the vehicle. The side rails are identical for both types of motor vehicle and selectively form a low second support zone for a longitudinal lateral edge of the sheet metal roof of the vehicle of the first type or a high first support zone for a lower face of the glass roof of the vehicle of the second type.

14 Claims, 2 Drawing Sheets

(58) Field of Classification Search
USPC .................................. 296/203.03, 210, 213
See application file for complete search history.

(56) References Cited

U.S. PATENT DOCUMENTS

| | | | | |
|---|---|---|---|---|
| 8,123,286 B2* | 2/2012 | Furusako | ............... | B62D 25/06 |
| | | | | 296/203.03 |
| 8,770,657 B2* | 7/2014 | Shirai | ................... | B62D 25/07 |
| | | | | 296/203.03 |
| 9,623,812 B2* | 4/2017 | Sakurai | ................... | B60N 3/02 |
| 2003/0011213 A1* | 1/2003 | Zinsmeister | ........... | B62D 25/06 |
| | | | | 296/210 |

OTHER PUBLICATIONS

French Preliminary Search Report dated Jun. 10, 2015 in French Patent Application No. 1460247 filed Oct. 24, 2014.

\* cited by examiner

RANGE OF AT LEAST TWO TYPES OF MOTOR VEHICLE COMPRISING A SHEET METAL ROOF OR A GLASS ROOF

BACKGROUND

The present invention relates to a range of at least two types of motor vehicle, of which a first vehicle type comprises a sheet metal roof and a second vehicle type comprises a glass roof.

A motor vehicle body shell structure traditionally comprises components that are assembled to one another. With reference to FIG. 1, this body shell structure generally comprises at least one front crossmember 3 of a roof 1 that extends transversely and holds a windshield and the roof 1, a rear crossmember 4 of a roof 1 that extends substantially parallel to the front crossmember 3 and in the rear zone of the roof 1, two longitudinal rails 2 of a roof 1 that connect a transverse end of the front crossmember 3 to the corresponding end of the rear crossmember 3, and a roof that rests at least on the front 3 and rear 4 crossmembers and on the rails 2.

Vehicle roofs 1 are generally joined to the body shell structure at multiple points on the periphery of the roof 1 and, in particular, at the level of the two rails 2. These rails 2 are formed by elements superposed in a substantially parallel manner, such as a sill reinforcement 7 secured to a body shell side 6 integral with the body shell structure of the vehicle, arranged, respectively, from the exterior of the vehicle toward the interior of the vehicle.

The roof 1 is generally mounted on the body shell structure in accordance with a particular configuration ensuring that the visible upper face of the roof is located in the extension of the visible upper face of the body shell side.

To achieve this, the prior art roofs 2 illustrated in FIGS. 2A and 2B have a peripheral part, the form of which is defined in order to ensure a link with the body shell structure, particularly with securing zones 9 located at the level of the body shell side by means of linking elements 8, with a view to allowing an arrangement of the roof in accordance with this configuration. However, the peripheral part of the roof is generally constructed in this way when the roof is made from a metal material, such as sheet metal.

In point of fact, in FIG. 2C, when the roof 1 is made from glass, the body shell structure then has to be modified, for example by means of the addition of an intermediate component 10, otherwise called an extension, which has to be positioned at the level of the rails 2 and, in particular, the body shell side 6 in order to be able to link this roof with the body shell side 6 of the body shell structure by means of the linking element 8.

One of the major drawbacks of such body shell structures hence relates to the fact that it is systematically necessary to modify them in order that they can be adapted to the characteristics of the roofs on which they are to be mounted. Systematic adaptation of body shell structures to the characteristics of the roofs is restrictive and even detrimental, in particular within the context of the manufacture of different vehicle models based on one and the same body shell structure. Furthermore, in this context, such an adaptation makes the procedures for mounting roofs on body shell structures more complex and at the same time increases the cost of manufacture of these vehicles.

BRIEF SUMMARY

The object of the present invention is to improve the compatibility of body shell structures with a broad range of roofs.

With this intention, the invention relates to a range of at least two types of motor vehicle, of which a first vehicle type comprises a sheet metal roof and a second type comprises a glass roof, these vehicles each comprising a body shell structure having side rails consisting of an outer wall facing the outside of the vehicle and an inner wall, forming an interior lining, facing the inside of the vehicle, the side rails being identical for both types of motor vehicle and selectively forming a low second support zone for a longitudinal lateral edge of the sheet metal roof of the vehicle of the first type or a high first support zone for a lower face of the glass roof of the vehicle of the second type.

In other embodiments:
  the low second support zone is formed on a longitudinal edge of an upper face of the outer wall of each side rail while the high first support zone is formed on a longitudinal edge of an upper face of the inner wall, forming the interior lining;
  the outer and inner walls define a gutter comprising a bottom formed by the low second support zone and an edge turned up toward the interior of the vehicle consisting of a second part of the outer wall comprising the high first support zone;
  the first and second support zones are included in substantially horizontal first and second planes;
  the high first support zone is located at a second height that is substantially greater than a first height of the low second support zone;
  the high first support zone and the low second support zone are arranged transversely in each side rail at third and second positions, respectively;
  the third position of the high first support zone is located at a second distance from a first position, the second distance being substantially greater than a first distance defined between the second position of the low second support zone and the first position;
  the high first support zone is mechanically connected to the lower face of the glass roof by means of a linking element, such as, in particular, adhesive;
  the low second support zone is mechanically connected to the longitudinal lateral edge of the sheet metal roof by means of a linking element, such as, in particular, a spot weld; and
  each side rail forms a third support zone for a longitudinal lateral edge of the sheet metal roof.

BRIEF DESCRIPTION OF THE DRAWINGS

Further advantages and features of the invention will become more clearly apparent on reading the following description of a preferred embodiment, with reference to the figures, which is given by way of indicative, non-limiting example.

DETAILED DESCRIPTION

The description is based on an orthonormal reference system (X, Y, Z) conventionally associated with a motor vehicle, in which X is the rearward front-to-rear longitudinal direction of the vehicle, Y is the rightward transverse direction, and Z is the upward vertical direction.

Figure 1:
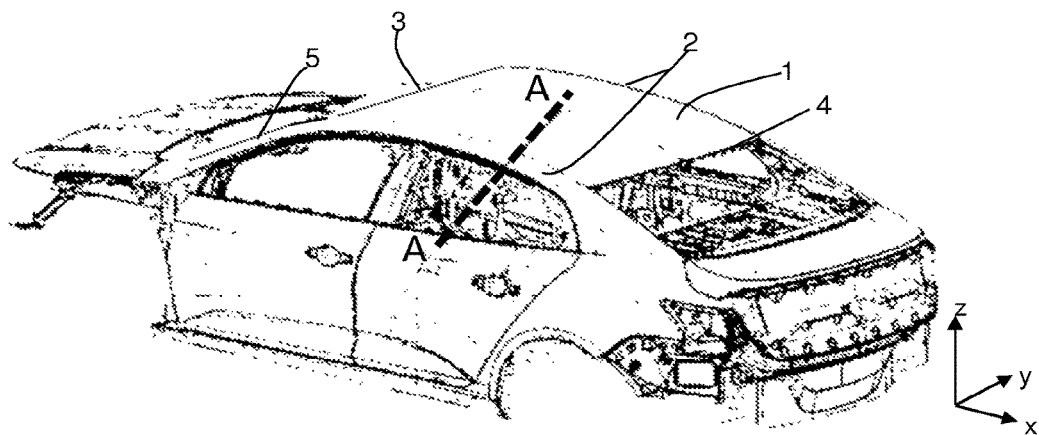
FIG. 1 shows a vehicle comprising a prior art body shell structure.
Figure 2A:
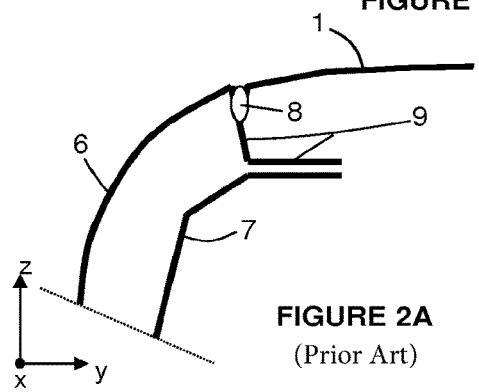
FIGS. 2A, 2B, 2C are schematic representations of a view of a transverse section on A-A of the view of FIG. 1 of a rail of the body shell structure mounted on a prior art roof.
Figure 2B:
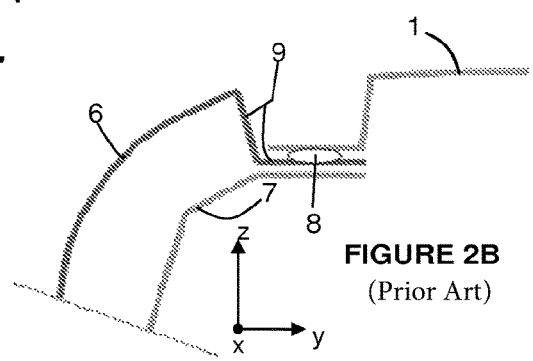
Figure 2C:
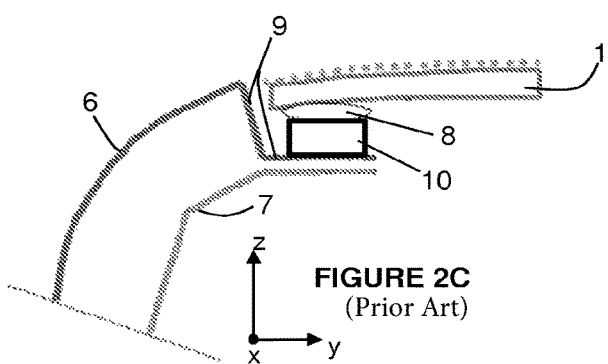
Figure 3:
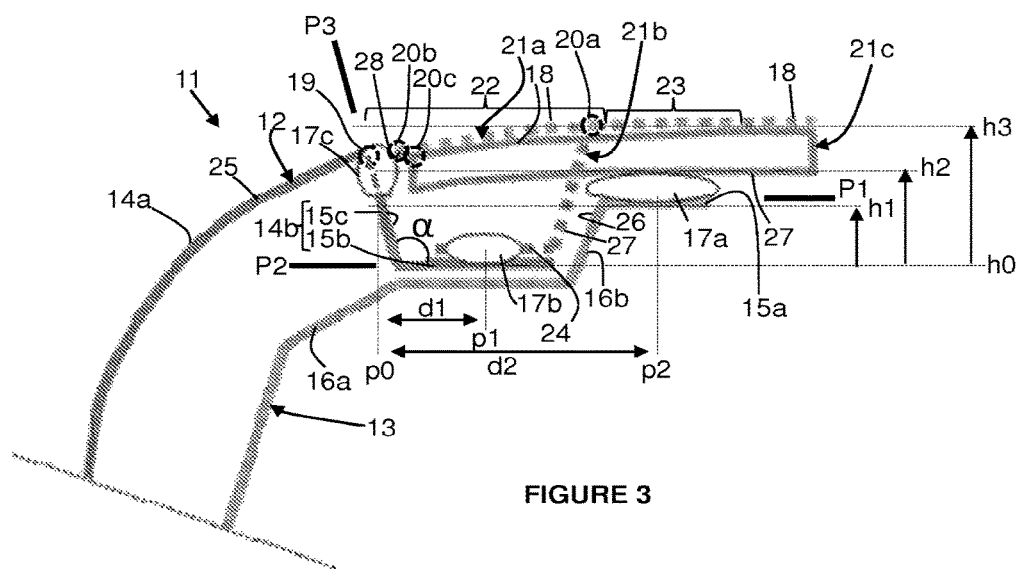
FIG. 3 shows a transverse section of a rail of a body shell structure mounted on a roof according to the embodiment of the invention.

In this embodiment of the invention, a range of at least two types of motor vehicle comprises:
- a first type of vehicle comprising a body shell structure that is capable of being mounted on a metal, for example a sheet metal, roof 21a, 21b, visible in broken lines in FIG. 3; and
- a second type of vehicle, the body shell structure of which is likewise capable of being mounted on a glass roof 21c, visible in said FIG. 3.

For each vehicle in this range, the body shell structure comprises front and rear roof crossmembers (not shown) and at least one side rail 11, preferably two side rails 11. It will be noted that the side rails 11 are identical for motor vehicles in the range.

The following meanings are to be understood:
- "rail" 11 is a structural component designed to support at least one lateral part of the roof 21a, 21b, 21c, extending essentially in the longitudinal direction of the vehicle; and
- "crossmember" is a structural component designed to support at least one part of the roof 21a, 21b, 21c, extending essentially in the transverse direction of the vehicle, joining two rails located on either side of the roof.

More precisely, the front crossmember is oriented transversely in relation to the vehicle, in a front part of the roof 21a, 21b, 21c. This front crossmember is located between pillars that frame and support a windshield, and the side rails 11 of a roof 21a, 21b, 21c that extend longitudinally toward the rear of the vehicle and support the roof 21a, 21b, 21c.

The side rails 11 of a roof 21a, 21b, 21c are connected at their opposite end by front and rear crossmembers, such that the assembly formed by the front crossmember, by the side rails 11 of a roof 21a, 21b, 21c, and by the rear crossmember defines an opening that substantially has the form of a parallelogram.

In FIG. 3, each side rail 11 is formed by a wall 12 outside the body shell structure, which is also called a body shell side and faces the exterior of the vehicle, and by an inner wall 13, otherwise known as a sill reinforcement, which faces the interior of the vehicle and forms an interior lining or, alternatively, an interior reinforcement. This outer wall 12 is connected mechanically to the inner wall 13, for example by welding.

In this embodiment, when the roof 21a, 21b, 21c is mounted on the body shell structure, it is supported and secured on the assembly formed by the front and rear crossmembers and the side rails 11 of a roof in accordance with a particular configuration. This particular configuration involves the roof 21a, 21b, 21c being mounted on this assembly such that a visible upper face 18 of this roof 21a, 21b, 21c is arranged in the extension of the bodywork parts of the vehicle that are visible from outside the vehicle and are located at the level of the perimeter of a peripheral part 22 of the roof 21a, 21b, 21c. Visible upper face 18 of the roof 21a, 21b, 21c is understood to mean the largest portion of the upper face 18 of the roof, which lies substantially in one and the same plane. Thus, an edge 20a, 20b, 20c formed at the level of this visible upper face 18 of the roof and which extends longitudinally is located at the same height as an edge 19 of the outer wall 12 that it faces. In other words, the edge 19 of the outer wall 12 and the edge 20a, 20b, 20c formed at the level of the visible upper face 18 of the roof 21a, 21b, 21c can lie in one and the same plane.

In particular, the visible upper face 18 of the roof 21a, 21b, 21c is arranged in the alignment and/or the extension of a first part 14a of an upper face 25 of the outer wall 12 of the body shell structure that will be defined below and is visible in FIG. 3. The roof 21b, 21c thus comprises a lower face 27, which is in part in contact with the side rails 11, and the upper face 18, which is oriented toward the exterior of the vehicle.

In each side rail 11, the inner wall 13 is preferably made from a metal material and comprises two parts: a first part 16a at the level of all or part of which the inner wall 13 is connected to the outer wall 12 of the body shell structure, and a second part 16b in the shape substantially of an inverted L in the extension of the first part 16a and which comprises a substantially planar high first support zone 15a. This high first support zone 15a is formed on a longitudinal edge of an upper face 26 of the inner wall 13 forming the interior lining.

This second part 16b can span the opening included in the body shell structure that is defined by the assembly formed by the front and rear crossmembers and the side rails 11 of a roof. The second part 16b spans the opening upward in the direction Z.

The high first support zone 15a is included in a substantially horizontal plane P1. This high first support zone 15a is able to interact with a part 23 of the lower face 27 of the glass roof 21c extending longitudinally in the direction X and forming a securing zone of the roof 21c arranged opposite this high first support zone 15a when the roof 21c is mounted on the body shell structure. The securing zone of the roof 21c is included in a plane parallel to the first plane P1. It will be noted that this securing zone of the roof 21c is preferably located in the part 23 of the lower face 27 of the glass roof 21c that is located close to the peripheral part 22 of the latter. The inner wall 13 and, in particular, the second part 16b thereof allows simultaneous positioning of the upper face 18 of the glass roof 21c in accordance with the particular configuration and the formation of a mechanical connection of this roof 21c to the side rail 11 and thus to the body shell structure. The inner wall 13, and more precisely the high first support zone 15a, is in particular suitable for being mechanically connected to the lower face 27 of the glass roof 21c, particularly by means of a linking element 17a, such as adhesive. In variant embodiments, other types of roof, particularly metal roofs, may likewise be mounted on the body shell structure by being connected thereto by means of the high first support zone 15a of the inner wall 13, using a suitable linking element 17a.

The outer wall 12 is preferably made from a metal material and comprises the upper face 25 that has two parts 14a, 14b: the first part 14a of the upper face 25 visible from the exterior of the vehicle, and a second part 14b of this face 25 that is not generally visible or, alternatively, only partially visible from the exterior owing to the fact that it is totally or partially covered by the roof 21a, 21b and, in particular, by the peripheral part 22 of the roof 21a, 21b when the latter is mounted on the body shell structure.

The second part 14b of the upper face 25 is formed by two support zones 15b, 15c: a low second support zone 15b and a third support zone 15c. These two support zones 15b, 15c, which are substantially planar, are connected together and form an angle α. This angle α, which may be an obtuse angle, is for example between 90° and 120°, preferably 95°. In particular, the low second support zone 15b is formed on a longitudinal edge of the upper face 25 of the outer wall 12 of each side rail 11, more precisely on the second part 14b.

The low second support zone 15b is included in a substantially horizontal second plane P2 parallel to the plane P1. This low second support zone 15b can interact with a lateral edge 24 of the peripheral part of the roof 21b extending longitudinally in the direction X and forming a securing zone of the roof 21b arranged opposite the low second support zone 15b when the roof 21b is mounted on the body shell structure. This securing zone of the roof 21b is included in a plane parallel to the second plane P2. It will be noted that this longitudinal lateral edge 24 is also called a rabbet.

In this embodiment, the longitudinal lateral edge 24 of the peripheral part 22 of this roof 21b can interact with the low second support zone 15b to allow simultaneous positioning of the upper face 18 of the roof 21b in accordance with the particular configuration and the formation of a mechanical connection of this roof 21b to each side rail 11 and thus to the body shell structure. To that end, the peripheral part 22 of this roof 21b has, for example, the shape of an L. The outer wall 12 of each side rail 11, and more precisely the low second support zone 15b, is in particular suitable for being mechanically connected to the longitudinal lateral edge 24 of the sheet metal roof 21b, particularly by means of a linking element 17b, such as a spot weld. In variant embodiments, other types of roof, particularly made from glass or from metal comprising a glazed aperture, may likewise be mounted on the body shell structure by being connected thereto by means of the low second support zone 15b of the outer wall 12 of each side rail 11, using a suitable linking element 17b.

The third support zone 15c is included in a third plane P3 that with the second plane P2 forms the angle α. This third support zone 15c is able to interact with a lateral edge 28 of the peripheral part 22 of the roof 21a extending longitudinally in the direction X and forming a securing zone of the roof 21a arranged opposite the third support zone 15c when the roof 21a is mounted on the body shell structure. The securing zone of the roof 21a lies in a plane parallel to the third plane P3. In this embodiment, the longitudinal lateral edge 28 of the peripheral part 22 of this roof 21a is able to interact with the third support zone 15c to allow simultaneous positioning of the upper face 18 of the roof 21a in accordance with the particular configuration and the formation of a mechanical connection of this roof 21a to each side rail 11 and thus to the body shell structure.

The outer wall 12 of each side rail 11 side rail, and more precisely the third support zone 15c, is in particular suitable for being connected mechanically to the lateral edge 20b of the peripheral part 22 of the sheet metal roof 21a, particularly by means of a linking element 17c, such as a laser weld. In variant embodiments, other types of roof, particularly made from glass or from metal comprising a glazed aperture, may likewise be mounted on the body shell structure by being connected thereto by means of the third support zone 15c of the outer wall 12, using a suitable linking element 17c.

As seen, the first, second and third support zones 15a, 15b, 15c can simultaneously support the roof 21a, 21b, 21c and secure it to the body shell structure. More precisely, the side rails 11 selectively form:
- the high first support zone 15a for the lower face 27 of the glass roof 21c of the vehicle of the second type;
- the low second support zone 15b for the longitudinal lateral edge 24 of the sheet metal roof 21b of the vehicle of the first type; or
- the third securing zone 15c for the longitudinal lateral edge 28 of the sheet metal roof 21a of the vehicle of the first type.

It will be noted that, in this embodiment, the outer and inner walls 12, 13 of each side rail 11 form a gutter comprising a bottom defined by the low second support zone 15b and an edge turned up toward the interior of the vehicle consisting of the second part 16b comprising the high first support zone 15a and an edge turned up toward the exterior of the vehicle consisting of the third securing zone 15c.

These first, second and third support zones 15a, 15b, 15c are arranged at the level of each side rail 11 at different first, second and third heights h0, h1, h2. More precisely, the first height h0 is, relative to the securing zone 15b, the lowest of each side rail 11 with reference to the fourth height h3, which corresponds to the height at which the upper face 18 of the roof 21a, 21b, 21c is located when the latter is mounted on the body shell structure in accordance with the particular configuration. This first height h0 is relative to the low second support zone 15b. The high first support zone 15a is, meanwhile, located at the second height h1, which is substantially greater than the first height h0. This second height h1 is defined relative to the first height h0 and is between approximately 5 and 15 mm, preferably 10 mm.

The third height h2 relative to the third support zone 15c is likewise defined relative to the first height h0 and is between approximately 10 and 25 mm, and is preferably 18 mm. It will be noted that the third height h2 is preferably substantially greater than the first and second heights h1 and h0 of the first and second support zones 15a, 15b. However, in an alternative, the third height h2 may be between the first and second heights h0 and h1 depending on whether the form of the peripheral part 22 of the roof 21a defines a securing zone that is able to interact with the third support zone 15c at this height h2.

The first, second and third support zones 15a, 15b, 15c are arranged transversely in a direction Y at the level of each side rail 11 of the body shell structure and at first, second and third positions p0, p1, p2. The third support zone 15c is that which is located at the level of each side rail 11 at a position closest to the lateral sides of the vehicle, and is the first position p0 visible in FIG. 3. The second and third positions p1 and p2 relative, respectively, to the second and first support zones 15b, 15a are defined relative to this first position p0 of the third support zone 15c.

The low second support zone 15b is located at the second position p1 which is located at a first distance d1 from the first position p0 and is between approximately 10 and 20 mm, and is preferably 15 mm.

The high first support zone 15a is, meanwhile, located at the third position p2 which is located at a second distance d2 from the first position p0 and is between approximately 40 and 60 mm, and is preferably 55 mm.

Thus, the third position p2 of the high first support zone 15a is located at the second distance d2 from the first position p0, which is substantially greater than the first distance d1 defined between the second position p1 of the low second support zone 15b and the first position p0.

In this embodiment, the body shell structure of each vehicle in the range can thus be mounted on roofs of different types provided with securing zones that can have diverse and varied forms. By comprising three support zones 15a, 15b, 15c for each side rail 11, the body shell structure is thus compatible with a large number of roofs 21a, 21b, 21c because it can support them and form a mechanical connection to their securing zone. Thus, there is no longer any need to modify the body shell structure, for example by the addition of a supplementary component, as in the prior art, in order to confer such compatibility thereon.

It will be noted that when the roof 21a, 21b, 21c is mounted on the body shell structure, it is possible to implement different configurations for securing this roof on this body shell structure in accordance with the type of roof 21a, 21b, 21c by means of a single support zone 15a, 15b, 15c or combinations of these three support zones 15a, 15b, 15c of the body shell structure.

The present invention is not limited to the embodiment expressly described, but includes the various variant embodiments and generalizations thereof contained within the scope of the following claims.

The invention claimed is:

1. A range of at least two types of motor vehicle, of which a first vehicle type comprises a sheet metal roof and a second type comprises a glass roof, these vehicles each comprising:
   a body shell structure having side rails comprising an outer wall facing an outside of the vehicle and an inner wall, forming an interior lining, facing an inside of the vehicle,
   wherein the side rails are identical for both types of motor vehicle and selectively form a low second support zone for a longitudinal lateral edge of the sheet metal roof of the vehicle of the first type or a high first support zone for a lower face of the glass roof of the vehicle of the second type, and
   wherein the low second support zone is formed on a longitudinal edge of an upper face of the outer wall of each side rail and the high first support zone is formed on a longitudinal edge of an upper face of the inner wall, forming the interior lining.

2. The range of at least two types of motor vehicle as claimed in claim 1, wherein the outer and inner walls define a gutter comprising a bottom formed by the low second support zone and an edge turned up toward an interior of the vehicle comprising a second part of the inner wall comprising the high first support zone.

3. The range of at least two types of motor vehicle as claimed in claim 1, wherein the first and second support zones are included in substantially horizontal first and second planes.

4. The range of at least two types of motor vehicle as claimed in claim 1, wherein the high first support zone is located at a second height that is substantially greater than a first height of the low second support zone.

5. The range of at least two types of motor vehicle as claimed in claim 1, wherein the high first support zone and the low second support zone are arranged transversely in each side rail.

6. The range of at least two types of motor vehicle as claimed in claim 5, wherein the high first support zone is located closer to an upper face of the sheet metal roof or the glass roof than the low second support zone.

7. The range of at least two types of motor vehicle as claimed in claim 1, wherein the high first support zone is mechanically connected to the lower face of the glass roof by a linking element.

8. The range of at least two types of motor vehicle as claimed in claim 7, wherein the linking element is adhesive.

9. The range of at least two types of motor vehicle as claimed in claim 1, wherein the low second support zone is mechanically connected to the longitudinal lateral edge of the sheet metal roof by a linking element.

10. The range of at least two types of motor vehicle as claimed in claim 9, wherein the linking element is a spot weld.

11. The range of at least two types of motor vehicle as claimed in claim 1, wherein each side rail forms a third support zone for a longitudinal lateral edge of the sheet metal roof.

12. The range of at least two types of motor vehicle as claimed in claim 11, wherein the third support zone is located closer to an upper face of the sheet metal roof or the glass roof than the high first support zone.

13. The range of at least two types of motor vehicle as claimed in claim 12, wherein the high first support zone is located closer to the upper face of the sheet metal roof or the glass roof than the low second support zone.

14. The range of at least two types of motor vehicle as claimed in claim 1, wherein the high first support zone is parallel to the low second support zone.

* * * * *